(12) United States Patent
Paliwal et al.

(10) Patent No.: US 7,536,599 B2
(45) Date of Patent: May 19, 2009

(54) METHODS AND SYSTEMS FOR VALIDATING A SYSTEM ENVIRONMENT

(75) Inventors: Bharat Paliwal, Foster City, CA (US); Debashis Saha, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 578 days.

(21) Appl. No.: 10/901,831

(22) Filed: Jul. 28, 2004

(65) Prior Publication Data

US 2006/0026463 A1 Feb. 2, 2006

(51) Int. Cl.
*G06F 11/00* (2006.01)
(52) U.S. Cl. .......................... 714/37; 714/15
(58) Field of Classification Search ............... 714/37, 714/38, 15, 21; 717/174–176
See application file for complete search history.

(56) References Cited

U.S. PATENT DOCUMENTS

| | | | |
|---|---|---|---|
| 5,564,051 A | 10/1996 | Halliwell et al. | |
| 5,692,106 A | 11/1997 | Towers et al. | |
| 5,822,531 A | 10/1998 | Gorczyca et al. | |
| 6,041,324 A * | 3/2000 | Earl et al. | 707/9 |
| 6,560,699 B1 | 5/2003 | Konkle | |
| 6,615,255 B1 | 9/2003 | Blaszczak | |
| 6,633,891 B1 | 10/2003 | Bamford et al. | |
| 6,671,874 B1 | 12/2003 | Passova | |
| 6,954,930 B2 * | 10/2005 | Drake et al. | 717/178 |
| 2001/0008019 A1 | 7/2001 | Vert et al. | |
| 2001/0056462 A1 | 12/2001 | Kataoka | |
| 2002/0049859 A1 | 4/2002 | Bruckert et al. | |
| 2002/0052937 A1 | 5/2002 | Jager | |
| 2002/0133727 A1 | 9/2002 | Dervin et al. | |
| 2002/0156951 A1 | 10/2002 | Beeston et al. | |
| 2002/0194015 A1 | 12/2002 | Gordon et al. | |
| 2002/0198967 A1 | 12/2002 | Jwanojko | |
| 2002/0198968 A1 | 12/2002 | Shirriff | |
| 2003/0018699 A1 | 1/2003 | Matthews et al. | |
| 2003/0018927 A1 | 1/2003 | Gadir et al. | |
| 2003/0074426 A1 | 4/2003 | Dervin et al. | |
| 2003/0120464 A1 * | 6/2003 | Taft et al. | 702/186 |
| 2003/0126504 A1 | 7/2003 | Ryan et al. | |
| 2003/0182650 A1 | 9/2003 | Smith | |
| 2003/0182656 A1 | 9/2003 | Leathers et al. | |
| 2003/0187927 A1 | 10/2003 | Winchell | |
| 2003/0208750 A1 | 11/2003 | Tapper | |
| 2003/0220951 A1 | 11/2003 | Muthuligam et al. | |
| 2003/0220992 A1 | 11/2003 | DiRico | |
| 2003/0227477 A1 | 12/2003 | Kadiwala | |
| 2004/0006610 A1 * | 1/2004 | Anagol-Subbarao et al. | 709/222 |

(Continued)

FOREIGN PATENT DOCUMENTS

GB  2 368 682 A  5/2002

(Continued)

*Primary Examiner*—Dieu-Minh Le
(74) *Attorney, Agent, or Firm*—Townsend and Townsend and Crew LLP

(57) ABSTRACT

Methods, systems, and machine-readable mediums are disclosed for validating a system environment for a software application. In one embodiment, an input file having a plurality of validation tests identifiers identifying validation tests to validate a system environment for an application is read. At least a portion of the validation tests are executed. The results of the validation tests are outputted.

33 Claims, 5 Drawing Sheets

U.S. PATENT DOCUMENTS

| | | |
|---|---|---|
| 2004/0019820 A1 | 1/2004 | Whitlow |
| 2004/0106088 A1* | 6/2004 | Driscoll et al. .............. 434/118 |
| 2005/0234680 A1* | 10/2005 | Dettinger et al. ............ 702/182 |

FOREIGN PATENT DOCUMENTS

| | | |
|---|---|---|
| WO | WO99/24945 A1 | 5/1999 |
| WO | WO02/46914 A2 | 6/2002 |
| WO | WO03/048994 A2 | 6/2003 |
| WO | WO 03/073278 A2 | 9/2003 |

* cited by examiner

METHODS AND SYSTEMS FOR VALIDATING A SYSTEM ENVIRONMENT

BACKGROUND

Many applications have system environment requirements that must be fulfilled for the application to execute properly. While these system requirements can be documented in user guides, it is common practice for users not to read the information and/or confirm whether the particular system environment on which the application is to be executed satisfies the application's system requirements. If the system requirements are not met, the application may fail to install correctly. In the worst case scenarios, the application can behave unpredictably, possibly resulting in system corruption.

Problems arising because a system environment fails to meet an application's requirements often result in user dissatisfaction with the application. Additional, a large number of support calls may be generated to the application developer. To avoid problems with a system environment, installation developers may write custom libraries for an application to test for system environment requirements (e.g., system parameters, OS versions, packages, patches, service packs, etc.). While avoiding problems that may occur by relying on a user manually performing all of the prerequisite checks for an application, custom program code may lead to different problems.

One problem with the customized program code is that the code for executing the validation tests is only performed at installation time. Additionally, the validation tests may not be modified without re-releasing the medium storing the application and installation scripts. It is also not possible to add new checks without re-releasing the medium. Finally, the customized installation scripts are not able to take advantage of the fact that many applications share at least some of the same system environment requirements.

SUMMARY

Systems, methods, and machine-readable mediums are disclosed to validate a system environment for an application. In one embodiment, a method is provided which comprises reading an input file (e.g., a Extended Markup Language (XML) file). The input file has a plurality of validation test identifiers identifying validation tests to validate a system environment for an application. At least a portion of the validation tests are executed and the results of the validation tests are outputted.

In some embodiments, executing the validation tests may comprise, for at least a portion of the plurality of validation tests, obtaining a mapping between the validation test identifier and a program code identifier. The program code identifier identifies program code for executing the validation tests. By way of example, the mapping may be obtained by reading a mapping file, such as an XML file. The program code identified may then be executed.

As another example, executing the validation tests may comprise obtaining a knowledge source having information used by at least one of the validation tests. In one embodiment, the knowledge source may comprise system platform requirements for the application to execute on a system platform. For example, system platform requirements may comprise one or more of operating system packages, operating system patches, and memory requirements for the system platform. In another embodiment, obtaining the knowledge source may comprise obtaining information on a host system for the application. This information may be obtained using a variety of mechanisms, such as reading a file having the host system information, executing program code to obtain the system information, and/or obtaining one or more user inputs. Optionally, the system information that is obtained from executing program code or user inputs may be stored in a file.

In some embodiments, the input file may also be read on a second machine. A second mapping may then be obtained between the validation test identifier and a second program code identifier identifying second program code for executing the validation test. The method may also, or alternately, further comprise reading a second input file. The second input file has a plurality of second validation test identifiers identifying second validation tests. The second validation tests may be used to validate the system environment for a second application. At least a portion of the second validation tests may be executed and the results of the second validation tests may be outputted.

The results of the validation tests may also be output using a variety of means. For example, the results may be output to a second file. The second file may include failed validation test identifiers which identify validation tests that failed. In one embodiment, the second file may be read upon receiving an indication and at least a portion of the validation tests associated with the failed validation test identifiers may be executed. As another example, the results may be output to a console or a graphical user interface (GUI).

In addition to the results of the validation tests, the result information may include other types of information, such as a severity for the validation tests that failed and/or a recommended course of action for the failed validation tests. In other embodiments, the result information outputted may include at least one validation test to be performed manually by the user. Instructions on how to execute the manual validation test may also be provided. In those embodiments, the method may also further comprise receiving an indication from the user that the manual validation test passed.

In a second embodiment, the method may comprise reading an input file having a plurality of validation test identifiers identifying validation tests to validate a system environment for an application. For at least a portion of the validation test identifiers, a mapping between the validation test identifier and a program code identifier identifying program code for executing the validation test is obtained. The program code is retrieved. A knowledge source used by the validation test is also obtained and the program code is executed using the knowledge source. A result of the validation test is determined and is output to a file.

In a third embodiment, a system is disclosed which comprises a manager component configured to read an input file having a plurality of validation test identifiers identifying validation tests to validate a system environment for an application. The system also includes a rules engine component, communicatively coupled to the manger. The rules engine component is configured to receive one of the validation test identifiers from the manger component and to read a second file having a mapping between the validation test identifier and a program code identifier identifying program code to execute the validation test. The rules engine component is further configured to retrieve the program code, to execute the program code, and to determine a result of the validation test. Further details of the system are also disclosed.

The methods may also be embodied in at least one machine-readable medium having instructions which execute on the machine. A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
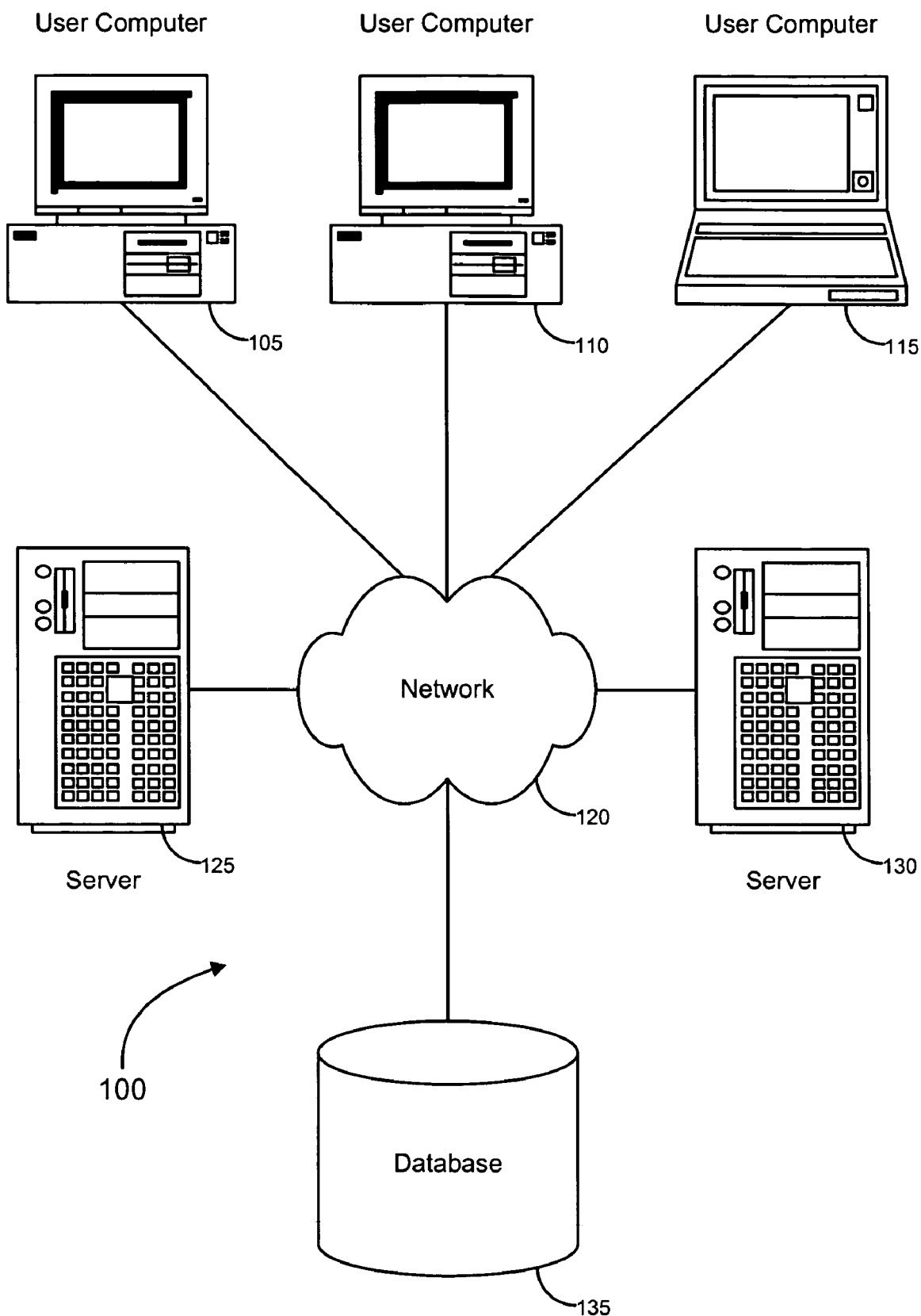
FIG. 1 is a block diagram of an exemplary computer network system having components upon which system environment requirements for an application may be validated.

FIG. 1 illustrates a block diagram of a system 100 that includes exemplary components upon which system environment requirements for an application may be validated. The system 100 includes one or more user computers 105, 110, and 115. The user computers 105, 110, and 115 can be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110, 115 may also have any of a variety of applications, including for example, database client and/or server applications, and web browser applications. Alternatively, the user computers 105, 110, and 115 may be any other electronic device, such as a thin-client computer, Internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers may be supported.

In some embodiments, the system 100 may also include a network 120. The network may can be any type of network familiar to those skilled in the art that can support data communications using any of a variety of commercially-available protocols, including without limitation TCP/IP, SNA, IPX, AppleTalk, and the like. Merely by way of example, the network 120 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 125, 130. One server may be a web server 125, which may be used to process requests for web pages or other electronic documents from user computers 105, 110, and 120. The web server can be running an operating system including any of those discussed above, as well as any commercially-available server operating systems. The web server 125 can also run a variety of server applications, including HTTP servers, FTP servers, CGI servers, database servers, Java servers, and the like.

The system 100 may also include one ore more file and or/application servers 130, which can, in addition to an operating system, include one or more applications accessible by a client running on one or more of the user computers 105, 110, 115. The server(s) 130 may be one or more general purpose computers capable of executing programs or scripts in response to the user computers 105, 110 and 115. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 130 may also include database servers, including without limitation those commercially available from Oracle, Microsoft, Sybase™, IBM™ and the like, which can process requests from database clients running on a user computer 105.

In some embodiments, an application server 130 may create web pages dynamically for displaying the development system. The web pages created by the web application server 130 may be forwarded to a user computer 105 via a web server 125. Similarly, the web server 125 can receive web page requests and/or input data from a user computer 105 and can forward the web page requests and/or input data to the web application server 130.

In further embodiments, the server 130 may function as a file server. Although for ease of description, FIG. 1 illustrates a separate web server 125 and file/application server 130, those skilled in the art will recognize that the functions described with respect to servers 125, 130 may be performed by a single server and/or a plurality of specialized servers, depending on implementation-specific needs and parameters.

The system 100 may also include a database 135. The database 135 may reside in a variety of locations. By way of example, database 135 may reside on a storage medium local to (and/or resident in) one or more of the computers 105, 110, 115, 125, 130. Alternatively, it may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 9i™, that is adapted to store, update, and retrieve data in response to SQL-formatted commands.

Figure 2:
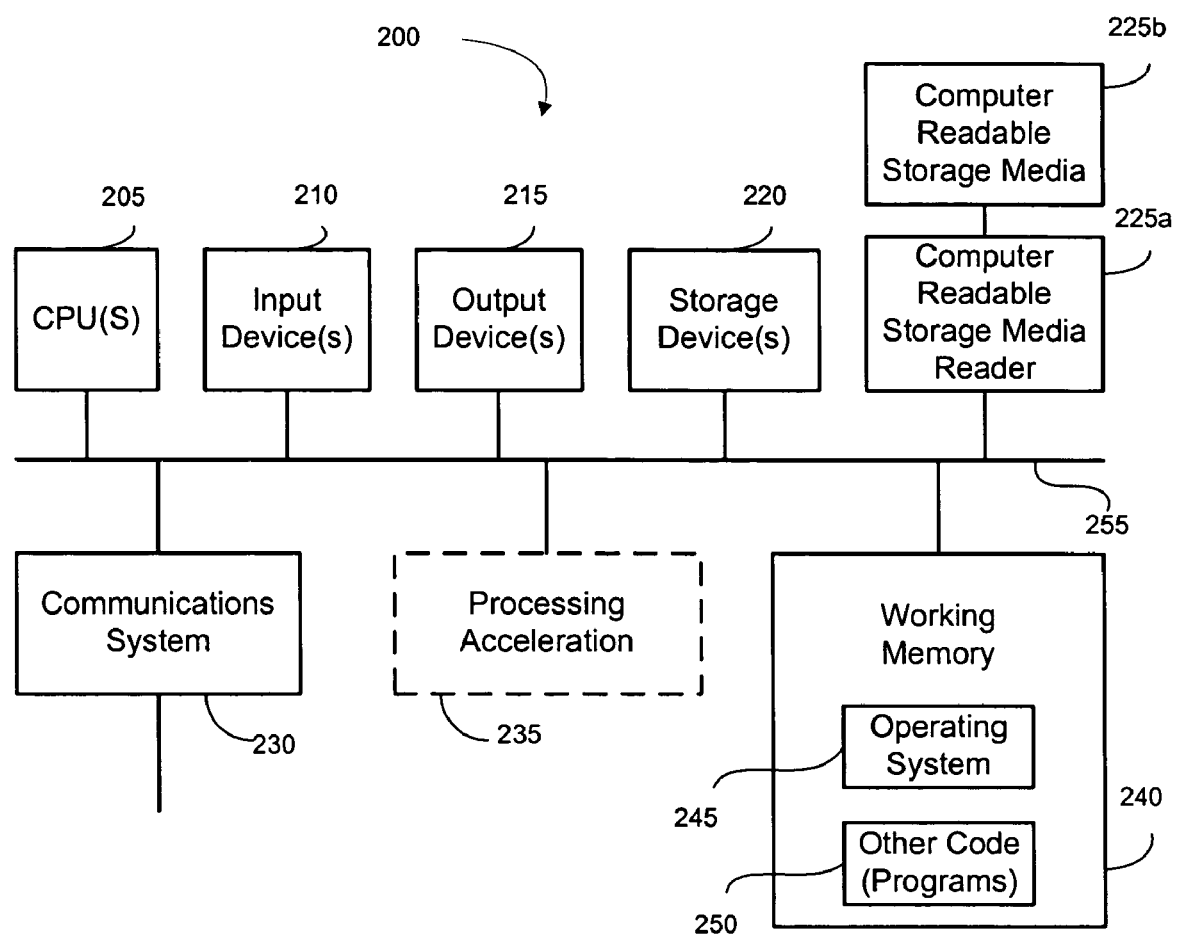
FIG. 2 is a block diagram of a computer system upon which a prerequisite checker may validate system environment requirements for an application.

FIG. 2 illustrates one embodiment of a computer system 200 upon which a prerequisite checker may be used to validate system environment requirements for an application to be deployed or executed on the computer system 200. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 120 and/or any other computer described above with respect to the system 100.

The computer system 200 may also comprise software elements, shown as being currently located within a working memory 240, including an operating system 245 and/or other code 250, such as an application program. As will be described in further detail below, a prerequisite checker may be used to validate the system environment requirements required for an application to execute properly.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
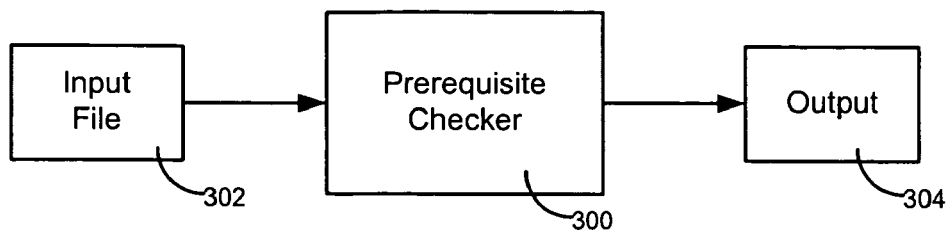
FIG. 3 is a block diagram illustrating an exemplary embodiment of a prerequisite checker that m ay be used to validate system environment requirements for an application.

FIG. 3 is a block diagram illustrating one embodiment of a prerequisite checker 300. Prerequisite checker 300 may be program code used to validate system environment requirements for one or more applications. The system environment requirements refer to requirements for the application to execute properly on a system, such as user computer 105, 110, 115 and/or server 125, 130. Merely by way of example, system environment requirements may include hardware element requirements (e.g., CPU speed, available memory, total memory, storage space capacity/availability, display capabilities of a display device, etc.), operating system requirements (e.g., operating system version, operating system packages, operating system patches (also referred to by some operating systems as service packs), etc.), system configuration requirements (e.g., page (swap) size, user privileges, etc.), and/or other applications executing on the system. Alternate or additional system environment requirements may also be verified by prerequisite checker 300.

Prerequisite checker may be a component of an installation program used to install an application or a component of the application (e.g., Oracle's Universal Installer). Upon successful completion of the validation tests validating a system environment, the installation program may be used to install the application or application component. Alternately, prerequisite checker 300 may be a standalone program, that may be executed independent of installation of an application. To determine which validation tests are to be executed for an application, prerequisite checker may read an input file 302. The input file 302 may be used to identify the validation tests to be executed to validate system environment requirements for the application. In one embodiment, the input file may be an XML file having a plurality of validation test identifiers identifying validation tests to be executed. Other formats may also be used for the input file. The validation test identifiers may identify a single validation test or a group of validation tests. Other types of information may also be included in the input file. For example, the input file may further include a description of the validation test, a severity (e.g., warning, critical, etc.) associated with a failure of the validation test, text to be output if the validation test fails, recommendation text recommending a course of action if the validation test fails, and/or other type of information that may be used by a validation test, or by a user or installation program. In some embodiments, the severity of a failed validation test indicated in the input file may determine if subsequent validation tests should be executed. As will be described in further detail below, the input file may also identify sources of information to be used to execute the validation test.

It should be appreciated that by using an input file 302 to specify the validation tests to execute, the prerequisite checking for an application may be easily modified to include different or additional tests. It should also be appreciated that by using different input files 302, prerequisite checker 300 may be used to validate system environment requirements for multiple application having different system environment requirements. Additionally, prerequisite checker 300 may also be used to validate the system environment for an application for more than one system platform (hardware/operating system combination of a system) to execute the application.

Prerequisite checker 300 may output the results of the validation tests in various format. For example, a log file may be used to log the results and progress of each validation test. Alternately, or additionally, messages may be displayed to a user via a console or graphical user interface (GUI). Further, in some embodiments, an output file may be created by prerequisite checker 300 that may be used as an input file, or part of the input, to subsequent validation of the system environment after corrective action has been taken to resolve a failed validation test.

Figure 4:
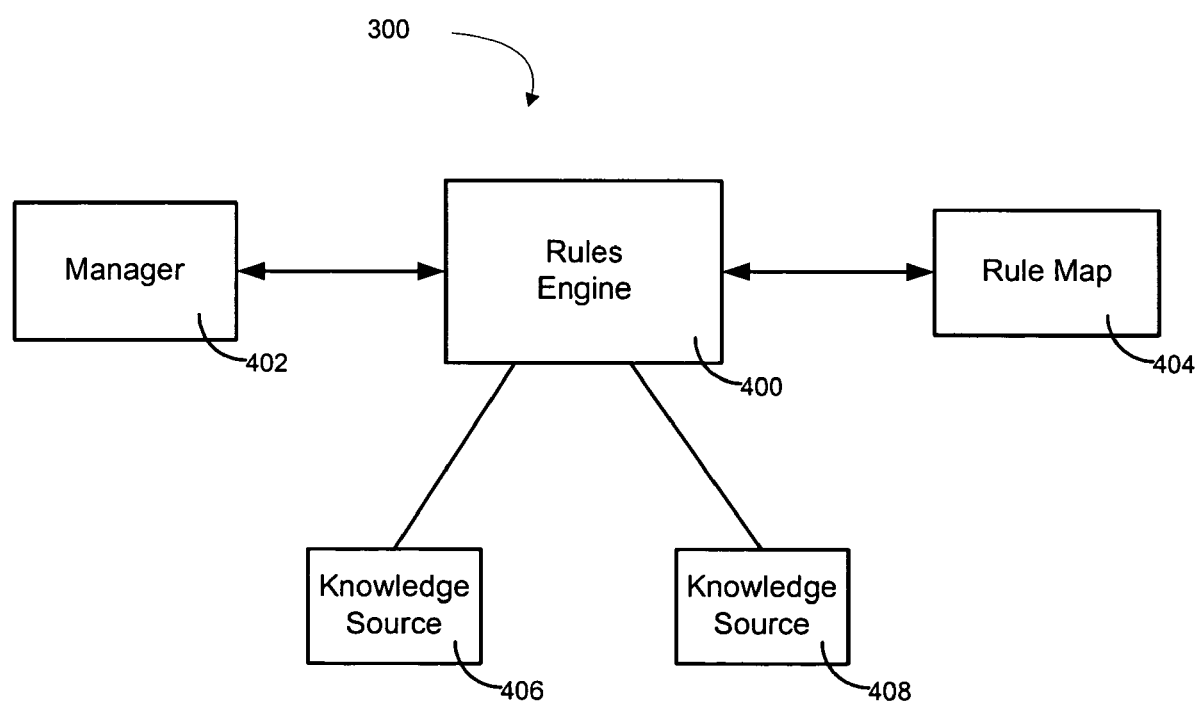
FIG. 4 is a block diagram illustrating an exemplary embodiment of the prerequisite checker of FIG. 3.

In some embodiments, prerequisite checker 300 may include a variety of components or modules. FIG. 4 illustrates one exemplary configuration of a prerequisite checker 300. In this embodiment, the prerequisite checker 300 includes a manager 402, a rules engine 400, a plurality of knowledge sources 406, 408, and a rule map 404. The rules engine 400 is communicatively coupled to each of the other components. A communicative coupling is a coupling that allows communication between the components. By way of example, this may be by means of an internal bus or an external communication means, such as network 120. Thus, the various components may reside on the same or different machines.

Manger 402 may be used to read the input file 302, which identifies the validation tests to be executed. The manager 402 may be responsible for transmitting the validation test identifiers to rules engine 400 for execution. In some embodiments, the validation test identifiers may be transmitted one at a time, so that manager 402 may monitor the results of each test. In some cases, if a validation test fails, subsequent validation test identifiers in the input file may not be transmitted to rules engine 400 for execution. For example, if a test for an operating system version fails, subsequent tests for operating system patches may not be executed.

The rules engine 400 may be include, or be communicatively coupled to, the program code used to execute the tests. Rules engine 400 may be used to execute the program code and determine a result of a validation test based on the program code execution. The result of the validation test may then be reported to manager 402. In one embodiment, the program code may be Java programs provided in class files, each class file including one or more methods used to execute a validation test. In order to determine which program code to execute, the rules engine 400 may be communicatively coupled to a rule map 404. The rule map 404 may map a validation test identifier to a program code identifier. By way of example, the rule map 404 may be a file, such as an XML file, or other type of file format.

In some embodiments, separate rule maps 404 may be provided for different system environments for an application (e.g., Solaris, Windows, etc.). This may facilitate the ability to specify the program code which executes a validation test (e.g., a test for available memory) on the different system platforms. Additionally, rule map 404 may also provide the ability to change the program code to execute a validation test and/or provide the ability to add custom validation tests to prerequisite checker 300 merely by providing a pointer in the rule map 404 to the custom program code. Alternate embodiments may not include rule map 404 and instead may rely on manger 402 or the input file 302 to identify the program code to execute for a validation test.

Rules engine 400 may also be communicatively coupled to one or more knowledge sources 406, 408 having information used by one or more validation tests. In some embodiments, there may be separate knowledge sources 406, 408 for different types of information. One example of a knowledge source 406 may be a knowledge source 406 having information on the actual host system for which the system environment for the application is being verified (e.g., the host system on which the application or application is to be installed). Another example may be a knowledge source 406 that includes information on an exemplary host system environment, such as a host environment which is replicated on multiple computers, such that all computers have the same or similar system environment parameters. By way of example, the host system information in a knowledge source may include available memory, total memory, CPU speed, page/swap size, device capabilities, operating system version, operating system packages/patches installed, applications (or a portion of the applications) installed, or other types of host system environment information.

Another type of knowledge sources 408 may be reference information used by the prerequisite checker 300 to determine system platform requirements for the application. A knowledge source 408 may be created for each of the system platforms for which the application has different system environment requirements. By way of example, a system platform knowledge source 408 may include total/available memory needed by the application to execute on the system platform, operating system packages and/or patches needed by the application to run properly on the system platform, memory requirements of the application for the system platform, system platform configuration requirements, and other types of information specifying the system platform requirements of the application.

As another example, a knowledge sources 408 may comprise information received by a user (e.g., whether the user has administrative privileges). Other types of knowledge sources are also contemplated. It should be appreciated that in alternate embodiments, the information used by validation tests may be contained in knowledge sources 406, 408 which are divided in different ways than that described above or the information may be contained in a single knowledge source.

In some embodiments, one or more knowledge sources may be used to validate a system environment for a host system for a future installation of an application. Thus, a knowledge source may model a "test" host environment for an anticipated configuration of a host system. This may assist a data center in setting up computers to meet an application's requirements before an attempt is made to install the application.

Program code may use a specified knowledge source to execute a validation test. By way of example, the knowledge source to be used for a validation test may be specified in the input file 302. It should be appreciated that knowledge sources 406, 408 may be stored in a variety of different types of formats or structures. In one embodiment, the knowledge sources are files, such as XML files. Other types of formats are also contemplated, such as databases, internal program storage structures, or other type of mechanism that may be used by rules engine 400.

The use of knowledge sources may allow the prerequisite checker 300 to be easily modified to change or add requirements for an application, and/or include new types of system platforms. Validation tests may be easily added using existing knowledge sources and/or new knowledge sources may be created or provided for specific validation tests. Additionally, as the knowledge sources are extensible, knowledge sources may be constructed for validation tests other than validation of system environments. Although the use of knowledge sources may facilitate the extensibility of prerequisite checking, alternate embodiments may not include knowledge sources 406, 408. Moreover, although the embodiments described herein pertain to validating computer systems, e.g., for software installation, the methodology and systems described herein could be used, in accordance with various other embodiments, for evaluating and/or validating any applicable system or process, including without limitation construction processes, manufacturing systems and/or processes, and/or the like.

Figure 5:
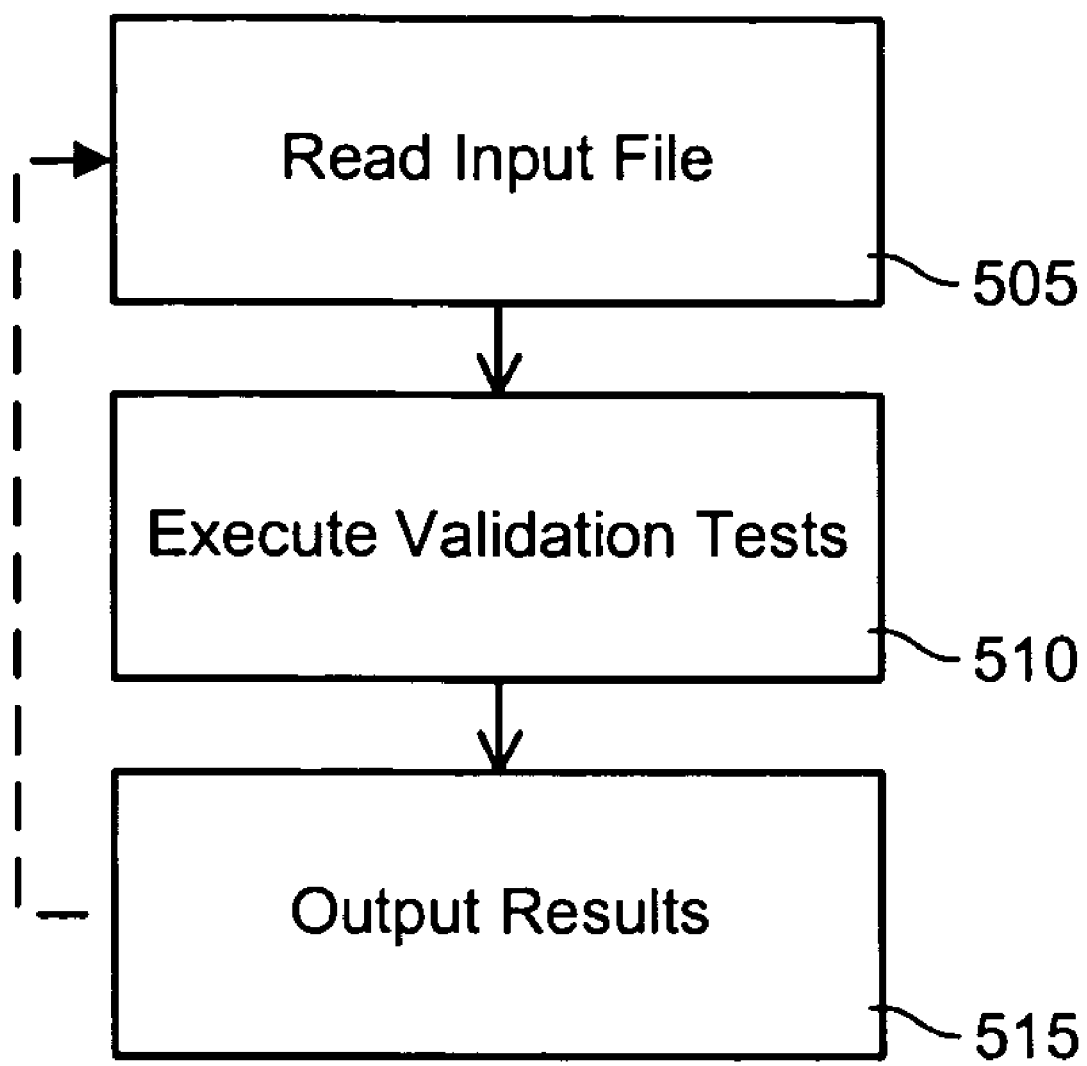
FIG. 5 illustrates an exemplary method that may be used to perform prerequisite checking to validate a system environment for an application.

FIG. 5 illustrates an exemplary method that may be used to perform prerequisite checking to validate a system environment for an application. An input file is read 505. The input file (e.g., an XML file) may have a plurality of validation test identifiers which identify validation tests that are used to validate a system environment for an application. The validation test identifiers may be identifiers which are mapped in a rule map 404, program code identifiers or program code invocations, or other means of identifying validation tests.

At least a portion of the validation tests identified by the validation test identifiers in the input file are executed 510. Some of the validation tests may cause critical errors, which cause other validation tests to not execute. For example, failure of a validation test which verifies that the system environment is using a supported operating system may result in validation tests for operating system patches to not execute. In some embodiments, as many of the validation tests as possible are executed 510 in order to provide a relatively complete listing of the system environment errors which need to be corrected for the application to execute properly.

The results of the validation test executions are outputted. The results indicate whether a validation test passed or failed, or has some other type of status. A variety of different mechanisms, or combination of mechanisms, may be used to output the results. For instance, the results of the validation tests may be output to a console and/or a GUI. Additionally, or alternately, the results may be output to a log file. In some embodiments, only the validation tests which fail are outputted. Thus, if the validation tests all execute successfully, the only output may be a message to that effect, or there may not be any output at all.

In one embodiment, the results of the validation tests may be output to a second file, such as an XML file. This file may include information of the failed validation test identifiers which identify validation tests that failed. This file may also include the validation test identifiers for validation tests which were not executed. In some embodiments, the second file which is output may be similar to the input file, but may have an indication for each test whether it passed, failed, or did not execute. Upon receiving an indication that the system environment has changed (e.g., a subsequent invocation of the prerequisite checker 300), the second file may be used as, or by, the input file 505 for the subsequent execution 510. Thus, on subsequent prerequisite checks, only the tests that failed, had some other type of error, or were not executed in a previous check may be executed.

Some of the validation tests may need to be executed manually by a user. Thus, in some instances, the execution 510 of the validation test may comprise a determination that the validation text is to be executed manually. In some embodiments, the input file may specify that a validation test is a manual test. Thus, the results that are output 515 may be specify that a test must be executed manually. Instructions on how to execute the manual validation test may also be provided. Optionally, the prerequisite checker 300 may wait to receive an indication from the user that the manual validation test passed before it determines that the prerequisite checking for the application completed successfully (e.g., before the application may be installed).

The method illustrated in FIG. 5 may be repeated on multiple computers. Alternately, or additionally, the method may be used to validate system environment requirements for a second application. At block 505, a second input file identifying the validation tests to use to verify the system environment for the second application is read 505. The validation tests for the second application are executed 510 and the results are outputted 515.

Figure 6:
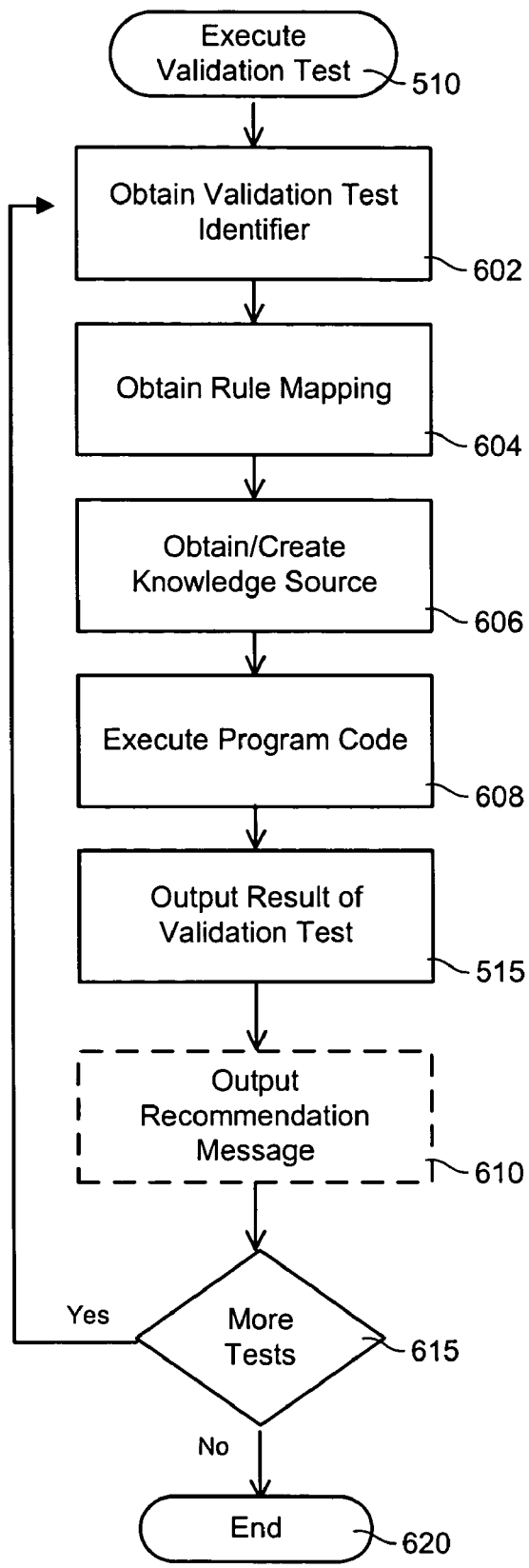
FIG. 6 is an exemplary method that may be used by the method of FIG. 5 to execute validation tests.

One exemplary method that may be used by the method of FIG. 5 to execute 510 validation tests is illustrated in FIG. 6. A validation test identifier 602 is obtained from the input file. Next, a rule mapping 404, which maps the validation test identifier to a program code identifier identifying program code for the validation test (class file, program method) is obtained 604. By way of example, the rule mapping may be obtained 604 by reading a rule map file (e.g., an XML file).

One or more knowledge sources 406, 408 may also be obtained 604. As previously described, knowledge sources 406, 408 may be files having information on a host system, system platform requirements, and/or information received as user inputs. In embodiments having multiple knowledge sources, the knowledge source used by a validation test may be indicated in the input file, the rule mapping file, or the validation test program code.

In some instances, a knowledge source for a validation test may not yet be created or may be dynamic. In those instances, the knowledge source may be created by executing program code to obtain the information and/or receiving one or more user inputs. The information that is created may optionally be stored (e.g., in a knowledge source file) for later use or subsequent invocations of prerequisite checker 300. In some embodiments, information that may be used to create a knowledge source builder may be maintained in a file. After the knowledge source builder is created, the builder may be used to obtain information on the system environment.

The program code identified in the rule mapping is then executed 608 using the knowledge source. In some embodiments, or with some output mechanisms, the results of each individual validation test are output 515 at the completion of the program code execution. In addition to the results of the test, other types of information may also be output. For example, if a validation test fails, recommendation text specifying a recommended course of action to correct the error may also be output 610. As a second example, a severity associated with a failed validation test may be output. In some embodiments, the additional information to be output may be retrieved from the input file.

If 615 there are more validation tests that were identified in the input file, the method may continue back at block 602 to obtain the next validation test identifier. Otherwise, the method may end 620. In some embodiments, if the prerequisite checking completed successfully, the application or application component may then be installed.

A similar method to that described above may also be used to execute validation tests for the application on a different system platform. The same input file 505 may be used to identify the validation tests to be executed. However, a different rule mapping may be obtained 604. The second rule mapping may map the validation test identifiers to the program code that executes a validation test on the subsequent system platform.

It should be appreciated that in alternate embodiments, validation tests may be executed 510 using a different or modified method than that described in FIG. 6. For instance, in some embodiments, a rule mapping may not be obtained 604 as the validation test identifier may identify the specific program code to execute for the validation test. Other modifications are also contemplated.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application;

reading a first rule mapping file to obtain a first mapping between a first validation test identifier and a first program code identifier identifying first program code for performing at least a portion of the first validation tests;

executing the first program code to perform the at least a portion of the first validation tests to determine whether the system environment's system resources meet the minimum requirement;

reading a second input file having a second plurality of validation test identifiers identifying second validation tests to validate the system environment for a second software application;

reading a second rule mapping file to obtain a second mapping between a second validation test identifier and a second program code identifier identifying second program code for performing at least a portion of the second validation tests;

executing the second program code to perform the at least a portion of the second validation tests to validate the system environment for the second software application; and outputting results of the validation tests.

2. The method of claim 1, wherein reading a rule mapping input file comprises reading an XML file mapping validation test identifiers to program code identifiers.

3. The method of claim 1, further comprising:

reading the second input file on a second machine; obtaining a second mapping between the second validation test identifier and the second program code identifier identifying the second program code for executing the validation test.

4. The method of claim 1, wherein receiving an input file comprises receiving an Extensible Markup Language (XML) file having a plurality of validation test identifiers.

5. The method of claim 1, wherein executing the validation tests comprises obtaining a knowledge source having information used by at least one of the validation tests.

6. The method of claim 5, wherein the knowledge source comprises system platform requirements for the first software application to execute on a system platform.

7. The method of claim 6, wherein the system platform requirements comprises one or more of operating system packages, operating system patches, and memory requirements for the system platform.

8. The method of claim 5, wherein obtaining the knowledge source comprises obtaining information on a host system for the first software application.

9. The method of claim 8, wherein the information includes one or more of available memory on the system, Central Processing Unit (CPU) speed, operating system installed on the system, packages installed on the system, operating system patches installed on the system, and one or more software applications installed on the system.

10. The method of claim 8, wherein obtaining the information on the system comprises reading a file.

11. The method of claim 8, wherein obtaining the information on the system comprises executing program code to obtain the system information.

12. The method of claim 11, further comprising storing the system information in a file.

13. The method of claim 8, wherein obtaining the system information comprises obtaining one or more user inputs.

14. The method of claim 5, wherein the knowledge source comprises a file.

15. The method of claim 1, wherein outputting the results of the validation tests comprises outputting the results to an output file.

16. The method of claim 15, wherein the output file further includes failed validation test identifiers identifying validation tests that failed, and wherein the method further comprises:

upon receiving an indication, reading the second file; and executing at least a portion of the validation tests associated with the failed validation test identifiers.

17. The method of claim 1, wherein outputting the results comprises outputting the results to one of a console and a graphical user interface (GUI).

18. The method of claim 1, wherein outputting the results comprises outputting a severity for at least a portion of the validation tests that failed.

19. The method of claim 1, wherein outputting the results comprises outputting a recommended course of action for at least a portion of the validation tests that failed.

20. The method of claim 1, wherein outputting the results comprises outputting at least one validation test to be performed manually by a user.

21. The method of claim 20, further comprising outputting instructions to execute the manual validation test.

22. The method of claim 20, further comprising receiving an indication from the user that the manual validation test passed.

23. The method of claim 1, wherein the executing at least a portion of the validation tests is independent of and prior to the installation of the software application.

24. A method comprising:

reading a first input file having first validation test identifiers identifying first validation tests to validate whether a system environment's level of system resources meet a minimum requirement, wherein the minimum requirement indicates a minimum level of system resources required for the system environment to support installation of a first software application, wherein the validation tests are associated with the first software application;

for at least a portion of the first validation test identifiers:

reading a first mapping file to obtain a first mapping between the portion of the first validation test identifiers and a first program code identifier identifying first program code for executing the portion of the first validation tests;

retrieving the first program code;

obtaining a first knowledge source used in the portion of the first validation tests;

executing the first program code using the first knowledge source to determine whether the system environment meets the minimum requirement;

determining a first result of the portion of the first validation tests; and outputting the first result to a file;

reading a second input file having second validation test identifiers identifying second validation tests to validate the system environment for a second software application; and for at least a portion of the second validation test identifiers:

reading a second mapping file to obtain a second mapping between the portion of the second validation test identifiers and a second program code identifier identifying second program code for executing the portion of the second validation tests;
retrieving the second program code;
obtaining a second knowledge source used in the portion of the second validation tests;
executing the second program code using the first knowledge source to validate the system environment for the second software application;
determining a second result of the portion of the second validation tests; and
outputting the second result to a file.

25. A computer system including a processor and comprising:
a manager component configured to read a first input file having a first plurality of validation test identifiers identifying a plurality of first validation tests to validate whether a system environment's level of system resources meet a minimum requirement, wherein the minimum requirement indicates a minimum of system resources required for the system environment to support installation of a first software application, and wherein the first plurality of validation tests is associated with the first software application;
a rules engine component, communicatively coupled to the manager, the rules engine configured to receive, from the manager, a first validation test identifier, of the first plurality of validation test identifiers; to read a first mapping file having a mapping between the first validation test identifier and a first program code identifier identifying first program code to perform a first validation test identified by the first validation test identifier; to retrieve the first program code; to execute the first program code; and to determine whether the system environment's system resources meet the minimum requirement;
wherein:
the manager component is further configured to read a second input file having a second plurality of validation test identifiers identifying second plurality of validation tests to validate a system environment for a second software application, wherein the second plurality of validation tests is associated with the second software application; and
the rules engine component is further configured to receive, from the manager, a first validation test identifier, the second plurality of validation test identifiers; to read a second mapping file having a mapping between a second validation test identifier and a second program code identifier identifying second program code to perform a second validation test identified by the second validation test identifier; to retrieve the second program code; to execute the second program code; and to determine a result of the second validation test.

26. The system of claim 25, wherein the rules engine is further configured to report the result of the validation tests to the manager.

27. The system of claim 25, further comprising a knowledge source, communicatively coupled to the rules engine, the knowledge source having information used by at least one of the validation tests.

28. The system of claim 27, wherein the knowledge source comprises a file.

29. The system of claim 25, further comprising the file.

30. The system of claim 25, further comprising an installation component to install the first software application or a component of the first software application upon successful completion of the first validation tests.

31. At least one machine readable storage medium, having stored thereon a plurality of instructions, which, when executed by a machine, cause the machine to perform the actions of:
reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application;
reading a first rule mapping file to obtain a first mapping between a first validation test identifier and a first program code identifier identifying first program code for performing at least a portion of the first validation tests;
executing the first program code to perform the at least a portion of the first validation tests to determine whether the system environment's system resources meet the minimum requirement;
reading a second input file having a second plurality of validation test identifiers identifying second validation tests to validate the system environment for a second software application;
reading a second rule mapping file to obtain a second mapping between a second validation test identifier and a second program code identifier identifying second program code for performing at least a portion of the second validation tests;
executing the second program code to perform the at least a portion of the second validation tests to validate the system environment for the second software application; and
outputting results of the validation tests.

32. At least one machine-readable storage medium, having stored thereon a plurality of instructions, which, when executed by a machine, cause the machine to perform the actions of:
reading a first input file having first validation test identifiers identifying first validation tests to validate whether a system environment's level of system resources meet a minimum requirement, wherein the minimum requirement indicates a minimum level of system resources required for the system environment to support installation of a first software application, wherein the validation tests are associated with the first software application;
for at least a portion of the first validation test identifiers:
reading a first mapping file to obtain a first mapping between the portion of the first validation test identifiers and a first program code identifier identifying first program code for executing the portion of the first validation tests:
retrieving the first program code;
obtaining a first knowledge source used in the portion of the first validation tests;
executing the first program code using the first knowledge source to determine whether the system environment meets the minimum requirement;
determining a first result of the portion of the first validation tests; and
outputting the first result to a file;
reading a second input file having second validation test identifiers identifying second validation tests to validate the system environment for a second software application; and for at least a portion of the second validation test identifiers:
  reading a second mapping file to obtain a second mapping between the portion of the second validation test identifiers and a second program code identifier identifying second program code for executing the portion of the second validation tests;
  retrieving the second program code;
  obtaining a second knowledge source used in the portion of the second validation tests;
  executing the second program code using the first knowledge source to validate the system environment for the second software application;
  determining a second result of the portion of the second validation tests; and
outputting the second result to a file.

33. A computer system including a processor and comprising:
  means for reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application;
  means for reading a first rule mapping file to obtain a first mapping between a first validation test identifier and a first program code identifier identifying first program code for performing at least a portion of the first validation tests;
  means for executing the first program code to perform the at least a portion of the first validation tests to determine whether the system environment's system resources meet the minimum requirement;
  means for reading a second input file having a second plurality of validation test identifiers identifying second validation tests to validate the system environment for a second software application;
  means for reading a second rule mapping file to obtain a second mapping between a second validation test identifier and a second program code identifier identifying second program code for performing at least a portion of the second validation tests;
  means for executing the second program code to perform the at least a portion of the second validation tests to validate the system environment for the second software application; and
  means for outputting results of the validation tests.

* * * * *

UNITED STATES PATENT AND TRADEMARK OFFICE
CERTIFICATE OF CORRECTION

| | | |
|---|---|---|
| PATENT NO. | : 7,536,599 B2 | Page 1 of 1 |
| APPLICATION NO. | : 10/901831 | |
| DATED | : May 19, 2009 | |
| INVENTOR(S) | : Paliwal et al. | |

It is certified that error appears in the above-identified patent and that said Letters Patent is hereby corrected as shown below:

Title page, Item (56), under "U.S. Patent Documents", line 2, delete "Jwanojko" and insert -- Iwanojko --, therefor.

In column 3, line 56, delete "may can" and insert -- can --, therefor.

In column 5, line 20, after "like" insert -- . --.

Signed and Sealed this

First Day of June, 2010

David J. Kappos
*Director of the United States Patent and Trademark Office*